United States Patent
Cham et al.

(10) Patent No.: US 9,067,545 B2
(45) Date of Patent: Jun. 30, 2015

(54) SPRING CLIP FOR USE IN A BRACKET ASSEMBLY

(75) Inventors: Jamshid Pouresfandiary Cham, Bellevue, WA (US); Nguyen T. Du, Lynnwood, WA (US); Donald G. Ingram, Everett, WA (US); Ashley LaGwyn House, Everett, WA (US); Paul D. Schneider, Snohomish, WA (US); Sean Richard Hesslewood, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 13/526,043

(22) Filed: Jun. 18, 2012

(65) Prior Publication Data

US 2013/0334387 A1   Dec. 19, 2013

(51) Int. Cl.

| A41F 1/00 | (2006.01) |
|---|---|
| A44B 1/04 | (2006.01) |
| A44B 1/18 | (2006.01) |
| A44B 11/25 | (2006.01) |
| A44B 17/00 | (2006.01) |
| B42F 1/00 | (2006.01) |
| B60R 13/02 | (2006.01) |
| B64C 1/06 | (2006.01) |
| B64C 1/40 | (2006.01) |

(52) U.S. Cl.
CPC ............. *B60R 13/0206* (2013.01); *B64C 1/066* (2013.01); *B64C 1/403* (2013.01)

(58) Field of Classification Search
CPC ........................................................ F16B 2/20

USPC ......... 248/580, 582, 584, 590, 596, 589, 608, 248/200, 237, 220.21, 222.11, 222.13, 248/222.52, 316.7, 343, 228.7, 230.7, 248/231.81; 24/530, 457, 458; 29/428

See application file for complete search history.

(56) References Cited

U.S. PATENT DOCUMENTS

| 2,421,549 | A | * | 6/1947 | Dillon ........................... 248/580 |
|---|---|---|---|---|
| 3,058,611 | A | * | 10/1962 | Chester ......................... 220/3.5 |
| 3,250,558 | A |   | 5/1966 | McClintock |
| 3,333,802 | A | * | 8/1967 | Goodman ..................... 248/539 |
| 4,413,849 | A |   | 11/1983 | Davis et al. |
| 5,236,760 | A | * | 8/1993 | Jinn .............................. 428/100 |
| 5,325,570 | A | * | 7/1994 | Chin-Ho ......................... 24/530 |
| 5,609,414 | A | * | 3/1997 | Caluori ......................... 362/366 |

(Continued)

FOREIGN PATENT DOCUMENTS

EP      0 262 704      4/1988

OTHER PUBLICATIONS

Claxton Fixture Company, Inc., Store and Restaurant Fixtures, [http://www.claytonfixture.com/html/miscellaneous_hardware.html] Printed Jun. 18, 2012.

(Continued)

*Primary Examiner* — Terrell McKinnon
*Assistant Examiner* — Michael McDuffie
(74) *Attorney, Agent, or Firm* — Baldauff IP, LLC; Michael J. Baldauff, Jr.

(57) ABSTRACT

Apparatus and methods provide a spring clip for use in a bracket assembly, such as a bracket assembly used to secure a ceiling panel to an aircraft or other vehicle or structure. According to embodiments described herein, a spring clip may include a spring portion according to a configuration of a space formed between a gonzo and a hinge.

14 Claims, 5 Drawing Sheets

(56) References Cited

U.S. PATENT DOCUMENTS

| | | | |
|---|---|---|---|
| 5,931,432 A * | 8/1999 | Herold et al. | 248/343 |
| 6,345,796 B1 * | 2/2002 | Neuman | 248/308 |
| 6,601,809 B1 * | 8/2003 | Gebrara | 248/229.16 |
| 7,357,541 B2 * | 4/2008 | Gamache et al. | 362/448 |
| 7,837,172 B2 * | 11/2010 | Johnson et al. | 248/343 |
| 8,272,612 B2 * | 9/2012 | Thorpe | 248/316.7 |
| 8,308,322 B2 * | 11/2012 | Santiago et al. | 362/365 |
| 8,403,277 B2 * | 3/2013 | Nuernberger et al. | 248/200.1 |
| 2008/0078899 A1 * | 4/2008 | Chen et al. | 248/220.21 |
| 2008/0224007 A1 * | 9/2008 | Mo | 248/231.81 |
| 2009/0090833 A1 * | 4/2009 | Daraz | 248/316.7 |
| 2010/0175229 A1 * | 7/2010 | Chang | 24/530 |
| 2010/0254123 A1 * | 10/2010 | Brown | 362/191 |
| 2011/0101831 A1 * | 5/2011 | Wang et al. | 312/223.1 |
| 2011/0180678 A1 * | 7/2011 | Liu | 248/343 |
| 2011/0192954 A1 * | 8/2011 | Cheng | 248/590 |
| 2011/0219589 A1 * | 9/2011 | Yoneyama | 24/530 |

OTHER PUBLICATIONS

Xiamen Yuanwangxing Hardware Spring Co., Ltd., Manufacturer supplied outlet V-shaped spring clip,Galvanized shrapnel,stamping products [http://www.aliexpress.com/product-gs/400379291-Manufacturer-supplied-outlet-V-shaped-spring-clip-Galvanized-shrapnel-stamping-products-wholesalers.html] Printed Jun. 18, 2012.

PCT International Search Report and Written Opinion dated Nov. 15, 2013 in PCT/US2013/041583.

* cited by examiner

SPRING CLIP FOR USE IN A BRACKET ASSEMBLY

BACKGROUND

Aircraft, as well as other types of vehicles or structures, may utilize a bracket assembly for securing ceiling panels within an interior of the aircraft. The bracket assembly may include multiple components. During taxiing, turbulence, or other events, the aircraft may experience shaking motions that cause rattling by the components of the bracket assembly. Such rattling may be undesirable especially for passengers of the aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods provide a spring clip for use in a bracket assembly, such as a bracket assembly used to secure a ceiling panel to an aircraft or other vehicle or structure. According to one aspect of the disclosure provided herein, a spring clip may be provided. The spring clip may include a spring portion configured according to a configuration of a space formed between a gonzo and a hinge.

According to another aspect, a ceiling panel bracket assembly may be provided. The ceiling panel bracket assembly may include a first bracket portion adapted to be fastened to a panel, a spring clip fastened to the first bracket portion, and a second bracket portion latched to the first bracket portion. The spring clip may be positioned to prevent contact between the first bracket portion and the second bracket portion.

According to yet another aspect, a method for forming a ceiling panel bracket assembly may be provided. The method may include one or more operations for configuring a spring clip according to a configuration of a space formed between a gonzo and a hinge of the ceiling panel bracket assembly and for disposing the spring clip within the space formed between the gonzo and the hinge to provide interference between the gonzo and the hinge.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a spring clip for use in a bracket assembly, such as a bracket assembly used to secure a ceiling panel to an aircraft or other vehicle or structure. For the sake of simplicity, the remainder of this disclosure will refer primarily to aircraft. However, it should be appreciated that the examples and embodiments described herein are not limited to aircraft and may be implemented on other vehicles or structures, as contemplated by those skilled in the art.

As discussed briefly above, a bracket assembly may include multiple components. During taxiing, turbulence, or other events, the aircraft may experience shaking motions that cause rattling by the components of the bracket assembly. In some instances, the rattling may be caused by rapid, periodic contact between two or more components. In other instances, the rattling may be caused by the shaking motion of an individual component that is not in a fixed positioned.

A bracket assembly may include a first bracket portion (also referred to herein as a "gonzo") and a second bracket portion (also referred to herein as a "hinge"). The gonzo may be fastened to a ceiling panel, and the hinge may be fastened to a stationary component of an aircraft. The gonzo may include a curved lip, and the hinge may include a clevis and a bushing. The bushing may be utilized to position the clevis over the curved lip such that the clevis latches to the curved lip, thereby securing the ceiling panel in place. However, space may be present between at least a portion of the clevis and the curved lip. As a result, shaking motions of the aircraft may result in rapid, periodic contact between the gonzo and the hinge, thereby causing rattling. For example, the contact may be metal-on-metal contact if at least portions of the gonzo and the hinge are composed of metal. Further, a shaking motion of the bushing may also cause rattling if the bushing is not secure.

According to various embodiments, a v-shaped spring clip may be fastened to the gonzo around the curved lip. As used herein, the term "v-shaped" may refer to substantially v-shaped and/or substantially u-shaped. When the clevis is positioned over the curved lip, the v-shaped spring clip may provide interference between the clevis and the curved lip such that the v-shaped spring clip eliminates any space between the clevis and the curved lip. By eliminating the space between the clevis and the curved lip, the v-shaped spring clip can effectively stop the rattling caused by the space. The v-shaped spring clip may also be in contact with the bushing such that the v-shaped spring clip secures the bushing in place. By securing the bushing in place, the v-shaped spring clip can prevent the bushing from rattling during a shaking motion of the aircraft. According to further embodiments, a spring clip having any suitable shape adapted to provide interference between the clevis and the curved lip may be utilized.

Figure 1:
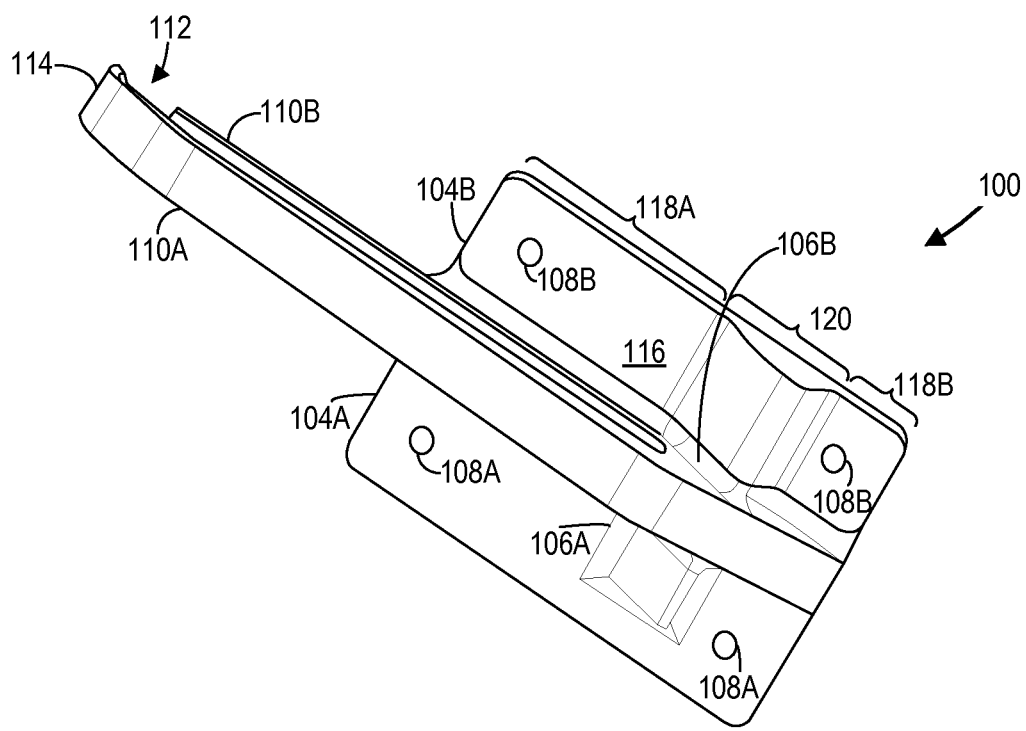
FIG. 1 is a top perspective view of an example gonzo, in accordance with some embodiments presented herein.

In the following detailed description, references are made to the accompanying drawings that form a part hereof, and which are shown by way of illustration, specific embodiments, or examples. Referring now to the drawings, in which like numerals represent like elements through the several figures, a v-shaped spring clip will be described. FIG. 1 is a top perspective view of an example gonzo 100, in accordance with some embodiments presented herein. The gonzo 100 may include a left flange 104A and a right flange 104B. The left flange 104A may include a left curved lip 106A. The right flange 104B may include a right curved lip 106B (partially covered in FIG. 1). It should be appreciated that the left curved lip 106A and the right curved lip 106B may be separate curved lips or a single curved lip extended across both the left flange 104A and the right flange 104B.

The left flange 104A may include one or more left holes 108A for fastening the gonzo 100 to a ceiling panel of an aircraft (not shown). The right flange 104B may also include one or more right holes 108B for fastening the gonzo 100 to the ceiling panel. The gonzo 100 may be fastened to the ceiling panel using a bolt, screw, pin, or other suitable fastening mechanism.

An upper protrusion 110A may extend outwardly from between the left flange 104A and the right flange 104B. A lower protrusion 110B (partially covered in FIG. 1) may also extend outwardly from between the left flange 104A and the right flange 104B. The upper protrusion 110A may be positioned over and spaced apart from the lower protrusion 110B such that the upper protrusion 110A and the lower protrusion 110B form an opening 112. In some embodiments, the upper protrusion 110A may form a crook-shaped tip 114 near the opening 112.

A v-shaped spring clip 116 may be fastened to the right flange 104B. As shown FIG. 1, the right curved lip 106B may be fully or partially covered by the v-shaped spring clip 116. The v-shaped spring clip 116 may include one or more holes that match or substantially match the one or more right holes 108B in the right flange 104B. By manufacturing the v-shaped spring clip 116 to have holes that match or substantially match the right holes 108B, the v-shaped spring clip 116 can be fastened to the gonzo 100 using the same hardware that is utilized to fasten the right flange 104B to the ceiling panel. In this manner, the v-shaped spring clip 116 can be installed or retrofit on existing gonzos without modification to the gonzos.

The v-shaped spring clip 116 may include a front extension 118A outwardly extending from a v-shaped portion 120. The v-shaped spring clip 116 may also include a rear extension 118B outwardly extending from the v-shaped portion 120. The front extension 118A and the rear extension 118B may be arranged on opposing ends of the v-shaped portion 120. The front extension 118A may be longer than the rear extension 118B. The front extension 118A and the rear extension 118B may be substantially flat with respect to the v-shaped portion 120. In particular, the front extension 118A and the rear extension 118B may be substantially flush with the ceiling panel to enable the v-shaped spring clip 116 to be fixed to the ceiling panel. The width of the v-shaped spring clip 116 may be equal to or less than the width of the right flange 104B. The length of the v-shaped spring clip 116 may be equal to or less than the length of the right flange 104B.

It should be appreciated that the configuration the v-shaped spring clip 116 described herein is merely an example. The specific configuration of the v-shaped spring clip 116 (e.g., the size or arrangement of the front extension 118A, the rear extension 118B, the v-shaped portion 120, etc.) may depend on the specific configuration of the gonzo 100 (e.g., the size or arrangement of the left flange 104A, the right flange 104B, the left holes 108A, the right holes 108B, the left curved lip 106A, the right curved lip 106B, etc.).

For purposes of illustrating the configuration of the left flange 104A, a v-shaped spring clip fastened to the left flange 104A is not shown in FIG. 1. However, it should be appreciated that the v-shaped spring clip 116 may also be fastened to the left flange 104A. According to some embodiments, the gonzo 100 may be fastened with one v-shaped spring clip 116 on either the left flange 104A or the right flange 104B. According to some other embodiments, the gonzo 100 may be fastened with two v-shaped spring clips 116, one on each of the left flange 104A and the right flange 104B. When the gonzo 100 is fastened with two v-shaped spring clips 116, the two v-shaped spring clips 116 may have the same or a different configuration depending on the specific configurations of the left flange 104A and the right flange 104B.

Figure 2:
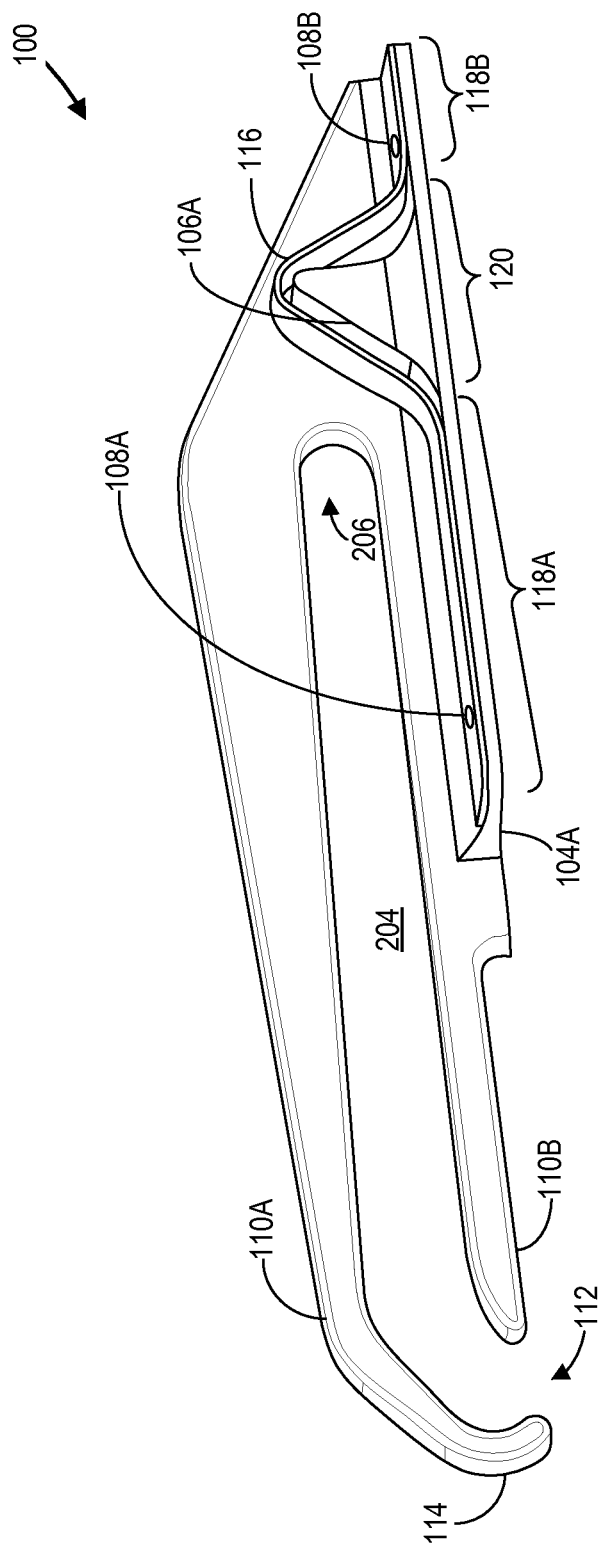
FIG. 2 is a side perspective view of an example gonzo, in accordance with some embodiments presented herein.

FIG. 2 is a side perspective view of the example gonzo 100, in accordance with some embodiments presented herein. The gonzo 100 may include the upper protrusion 110A and the lower protrusion 110B. The upper protrusion 110A and the lower protrusion 110B may form the opening 112. In accordance with some embodiments, the upper protrusion 110A may form the crook-shaped tip 114 near the opening 112. The opening 112 may provide an entrance into a cavity 204. The cavity 204 may terminate at a closed end 206. The gonzo 100 may also include the v-shaped spring clip 116 fastened to the left flange 104A.

The v-shaped spring clip 116 may include one or more holes that match or substantially match the one or more left holes 108A of the left flange 104A. The v-shaped spring clip 116 may include the front extension 118A, the rear extension 118B, and the v-shaped portion 120. The width of the v-shaped spring clip 116 may be equal to or less than the width of the left flange 104A. The length of the v-shaped spring clip 116 may be equal to or less than the length of the v-shaped spring clip 116. As previously described, the v-shaped spring clip 116 fastened to the left flange 104A may or may not be the same as the v-shaped spring clip 116 fastened to the right flange 104B.

The v-shaped spring clip 116 may be positioned over the left curved lip 106A, thereby providing interference between an object and the left curved lip 106A. In this case, the v-shaped spring clip 116 may be positioned apart from the left curved lip 106A. The v-shaped spring clip 116 may also be positioned over the right curved lip 106B, thereby providing interference between an object and the right curved lip 106B. In this case, the v-shaped spring clip 116 may also be positioned apart from the right curved lip 106B.

Figure 3:
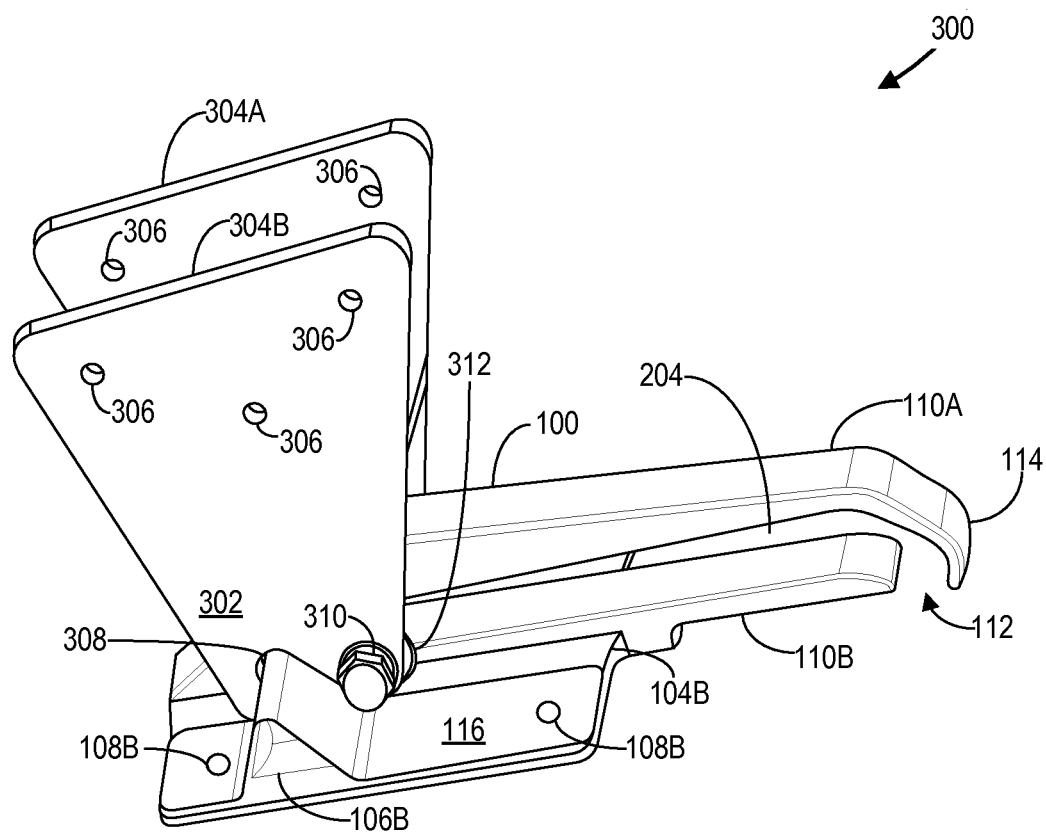
FIG. 3 is a side perspective view of an example bracket assembly, in accordance with some embodiments presented.

FIG. 3 is a side perspective view of an example bracket assembly 300, in accordance with some embodiments presented herein. The bracket assembly 300 may include a hinge 302. The hinge 302 may include a left plate 304A and a right plate 304B arranged in parallel. The hinge 302 may include one or more holes 306. The holes 306 may be utilized for receiving bolts, screws, pins, or other fastening mechanisms adapted to fasten the hinge 302 to a stationary component, such as a stationary component 402 illustrated in FIG. 4, of an aircraft.

The right plate 304B may include a right clevis 308. The right clevis 308 may include a bolt 310 that is fastened to a bushing 312 (partially covered in FIG. 3). The bushing 312 may be arranged across the left plate 304A and the right plate 304B. The left plate 304A may also include a left clevis (not shown) arranged in a similar configuration as the right clevis 308. The left clevis may include another bolt (also not shown) that is also fastened to the bushing 312 on an opposing end. In some embodiments, the bushing 312 may be a roller (e.g., a nylon roller) adapted to rotate around an axis corresponding to a direction of the bolt 310.

The bracket assembly 300 may also include the gonzo 100. The v-shaped spring clip 116 may be positioned over the right flange 104B such that the holes on the v-shaped spring clip 116 are positioned over the right holes 108B of the right flange 104B. When the v-shaped spring clip 116 is properly positioned over the right flange 104B, the gonzo 100 may be fastened to a ceiling panel of an aircraft by inserting bolts, screws, pins, or other fastening mechanisms through the holes on the v-shaped spring clip 116 and the right holes 108B of the right flange 104B. As previously described, the v-shaped spring clip 116 may be positioned over the right curved lip 106B.

When the gonzo 100 has been fastened to the ceiling panel, a technician or other suitable personnel may latch the gonzo 100 to the hinge 302. In an example process for latching the gonzo 100 to the hinge 302, the technician may tilt the ceiling panel upward such that the crook-shaped tip 114 is positioned over and makes contact with the bushing 312. In this manner, the bushing 312 can enter the cavity 204. When the bushing 312 enters the cavity 204, the technician may tilt the ceiling panel downward such that the lower protrusion 110B is substantially parallel with the ceiling panel.

The technician may guide the ceiling panel such that the bushing 312 moves towards the closed end 206. As previously described, the bushing 312 may be a roller adapted to rotate around the axis corresponding to the direction of the bolt 310. If the bushing 312 is configured as such a roller, then the technician may effectively guide the ceiling panel by rolling the bushing 312 along the interior surface of the upper protrusion 110A and/or the lower protrusion 110B. When the bushing 312 reaches the closed end 206, the technician may latch the gonzo 100 to the hinge 302 by positioning the right clevis 308 over the right curved lip 106B. The left clevis may also be positioned over the left curved lip 106A. When the technician latches the gonzo 100 to the hinge 302, the technician may then align the holes of the v-shaped spring clip 116 and the right holes 108B of the right flange 104B and insert bolts through the aligned holes in order to secure the gonzo 100 including the v-shaped spring clip 116 to the ceiling panel.

The v-shaped spring clip 116 may provide interference between the right clevis 308 and the right curved lip 106B. That is, the v-shaped spring clip 116 may sufficiently compress inward (e.g., from force applied by the technician during latching) in order to allow the right clevis 308 to latch to the right curved lip 106B. When the right clevis 308 latches to the right curved lip 106B, the v-shaped spring clip 116 may apply sufficient outward force to eliminate any space between the right clevis 308 and the right curved lip 106B. As a result, the v-shaped spring clip 116 can eliminate any rattling caused by rapid, periodic contact between the gonzo 100 and the hinge 302.

The v-shaped spring clip 116 may also be in contact with the bushing 312. In particular, the v-shaped spring clip 116 may apply sufficient outward force to secure the bushing 312 in place. As a result, the v-shaped spring clip 116 can eliminate any rattling caused by a shaking motion of the bushing 312. It should be appreciated that the v-shaped spring clip 116 may also be fastened to the left flange 104A in order to provide similar functionality with respect to the left clevis and the left curved lip 106A.

The v-shaped spring clip 116 may be formed from a single piece of metal that is stamped into a substantially v-shape or substantially u-shape. In other embodiments the spring clip 116 may be stamped into any shape configured to provide interference between a clevis, such as the right clevis 308, and a curved lip, such as the right curved lip 106B. The v-shaped spring clip 116 may be composed of, at least in part, stainless steel. The v-shaped spring clip 116 may also be coated with a suitable finish to prevent possible corrosion from repeated contact with the gonzo 100 and/or the hinge 302.

Figure 4:
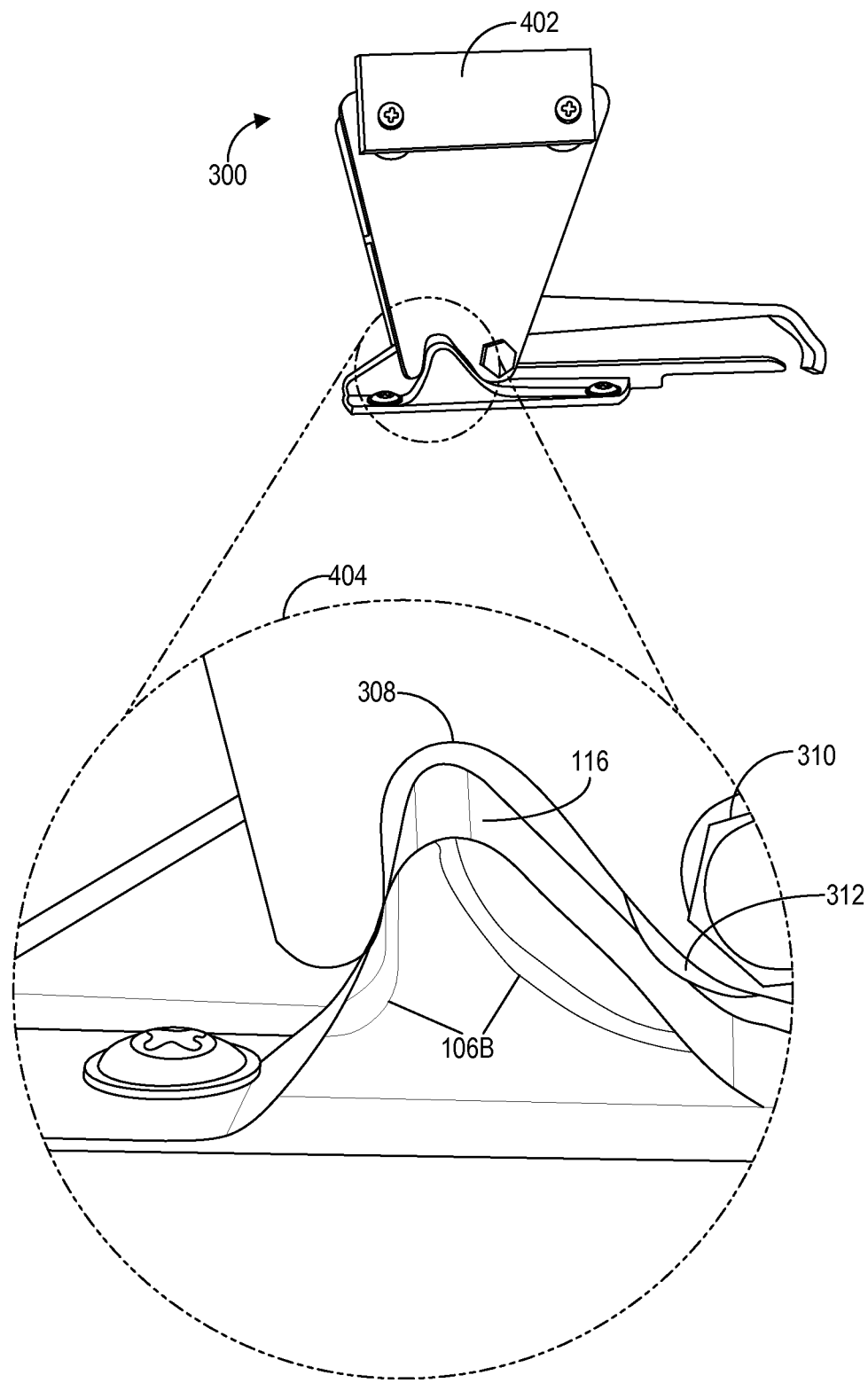
FIG. 4 is a partial view of an example bracket assembly, in accordance with some embodiments presented herein.

FIG. 4 is a partial view of the example bracket assembly 300, in accordance with some embodiments presented herein. As illustrated in FIG. 4, the bracket assembly 300 has been fastened to the stationary component 402 of an aircraft. In this manner, the bracket assembly 300 is fixed to the aircraft.

FIG. 4 also illustrates an expanded view 404 of the right clevis 308 and the v-shaped spring clip 116. As illustrated in FIG. 4, the v-shaped spring clip 116 may provide interference between the right clevis 308 and the right curved lip 106B. That is, the v-shaped spring clip 116 may eliminate any space between the right clevis 308 and the right curved lip 106B, as previously described. Also as illustrated FIG. 4, the v-shaped spring clip 116 may be in contact with the bushing 312 to secure the bushing 312 in place, as previously described.

As illustrated in FIGS. 1-4, the v-shaped spring clip 116 may be a separate component from a curved lip, such as the right curved lip 106B, of the gonzo 100. It should be appreciated that the v-shaped spring clip 116 and the curved lip may be integrated, in accordance with some other embodiments. That is, the v-shaped spring clip 116 may be configured to provide the functionality of the curved lip while also providing sufficient outward force to eliminate any space between a clevis, such as the right clevis 308, and the v-shaped spring clip 116.

Figure 5:
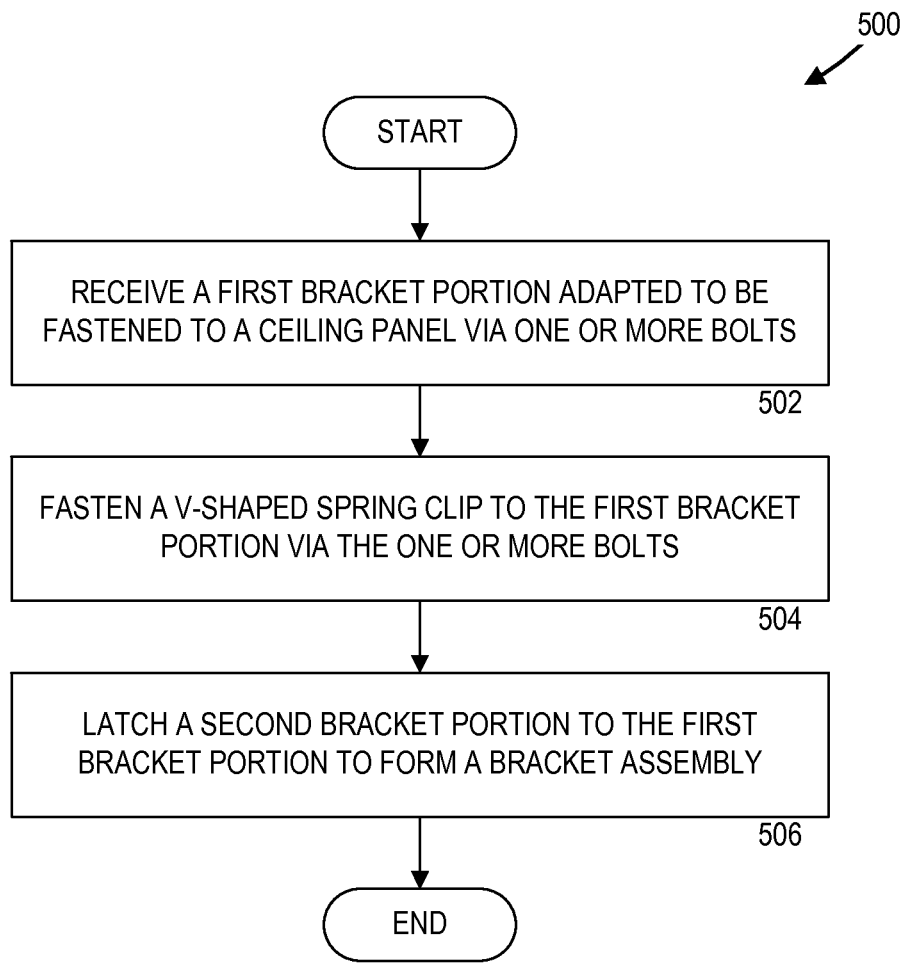
FIG. 5 is a flow diagram illustrating a method for forming an example bracket assembly, in accordance with some embodiments presented herein.

FIG. 5 is a flow diagram illustrating a method 500 for forming an example bracket assembly, such as the bracket assembly 300, in accordance with some embodiments presented herein. The method 500 may begin at operation 502, in which a first bracket portion, such as the gonzo 100, may be received. The first bracket portion may be fastened to a ceiling panel, such as a ceiling panel within an aircraft. The method 500 may proceed from operation 502 to operation 504, in which a v-shaped spring clip, such as the v-shaped spring clip 116, may be fastened to the first bracket portion.

The method 500 may proceed from operation 504 to operation 506, in which a second bracket portion, such as the hinge 302, may be latched to the first bracket portion to form the bracket assembly 300. For example, a clevis in the second bracket portion may be latched to a curved lip of the first bracket portion. The v-shaped spring clip may be adapted to prevent contact between the first bracket portion and the second bracket portion. The v-shaped spring clip may also be adapted to secure a bushing in the second bracket portion in place. After operation 506, the method 500 may repeat or terminate.

Based on the foregoing, it should be appreciated that a v-shaped spring clip for use in a bracket assembly, such as a bracket assembly used to secure a ceiling panel to an aircraft or other vehicle or structure, have been presented herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A spring clip, comprising:
   a v-shaped spring portion configured according to a configuration of a space formed between a curved lip of a gonzo and a clevis of a hinge;
   a first extension outwardly extending from a first end of the v-shaped portion and configured according to a portion of a flange of the gonzo, the first extension comprising a first extension hole corresponding to a first flange hole on the flange, the first extension hole and the first flange hole adapted to receive a first bolt for fastening the first extension to the flange and an object; and
   a second extension outwardly extending from a second end of the v-shaped portion and configured according to another portion of the flange of the gonzo, the second extension comprising a second extension hole corresponding to a second flange hole on the flange, the second extension hole and the second flange hole adapted to receive a second bolt for fastening the second extension to the flange and the object.

2. The spring clip of claim 1, wherein the spring portion is configured to be disposed within the space formed between the gonzo and the hinge; and wherein the spring portion is configured to provide interference between the gonzo and the hinge.

3. The spring clip of claim 1, wherein the v-shaped spring portion, the first extension, and the second extension are formed from a single piece of metal.

4. The spring clip of claim 3, wherein the metal comprises stainless steel.

5. The spring clip of claim 1, wherein the first extension and the second extension are substantially flat with respect to the v-shaped spring portion.

6. A ceiling panel bracket assembly, comprising:
a first bracket portion adapted to be fastened to a ceiling panel, the first bracket portion comprising a first flange and a second flange, an upper protrusion arranged between the first flange and the second flange, a lower protrusion arranged between the first flange and the second flange, and a curved lip arranged on the first flange or the second flange, wherein a first end of the upper protrusion and the lower protrusion form a closed end; and wherein a second end of the upper protrusion and the lower protrusion form an opening;
a spring clip fastened to the first flange of the first bracket portion; and
a second bracket portion latched to the first bracket portion, wherein the spring clip is positioned to prevent direct contact between the first flange of the first bracket portion and the second bracket portion.

7. The ceiling panel bracket assembly of claim 6, wherein the spring clip comprises a v-shaped spring clip disposed within a space formed between the first bracket portion and the second bracket portion.

8. The ceiling panel bracket assembly of claim 6, wherein the first bracket portion is adapted to be fastened to the ceiling panel via a first bolt and a second bolt, and wherein the spring clip is fastened to the first bracket portion via the first bolt and the second bolt.

9. The ceiling panel bracket assembly of claim 6, wherein the second bracket portion comprises a clevis and a bushing; wherein the first bracket portion is adapted to receive the bushing at the opening and to guide the bushing from the opening to the closed end; and wherein the clevis is adapted to latch to the curved lip.

10. The ceiling panel bracket assembly of claim 9, wherein the spring clip is adapted to secure the bushing in place.

11. The ceiling panel bracket assembly of claim 6, wherein a width of the spring clip is equal to or less than a width of the first flange or the second flange, and wherein a length of the spring clip is equal to or less than a length of the first flange or the second flange.

12. The ceiling panel bracket assembly of claim 6, wherein the direct contact between the first flange of the first bracket portion and the second bracket portion comprises metal-on-metal contact that causes rattling.

13. A method for forming a ceiling panel bracket assembly, comprising:
configuring a spring clip according to a configuration of a space formed between a gonzo and a hinge of the ceiling panel bracket assembly, the gonzo comprising a first flange and a second flange, an upper protrusion arranged between the first flange and the second flange, a lower protrusion arranged between the first flange and the second flange, and a curved lip arranged on the first flange or the second flange, wherein a first end of the upper protrusion and the lower protrusion form a closed end, and wherein a second end of the upper protrusion and the lower protrusion form an opening;
receiving the gonzo adapted to be fastened to a ceiling panel via one or more bolts;
fastening the spring clip to the gonzo via the one or more bolts; and
latching the hinge to the gonzo to form the ceiling panel bracket assembly.

14. The method of claim 13, wherein the hinge comprises a clevis and a bushing; and wherein the method further comprises:
receiving the bushing at the opening;
guiding the bushing between the upper protrusion and the lower protrusion to the closed end; and
latching the clevis to the curved lip.

* * * * *